United States Patent [19]

Dowd

[11] 3,742,059

[45] June 26, 1973

[54] COLOR-STABILIZED ALKANOLAMINES

[75] Inventor: William Dowd, Midland, Mich.

[73] Assignee: The Dow Chemical Company, Midland, Mich.

[22] Filed: May 24, 1971

[21] Appl. No.: 146,489

[52] U.S. Cl............................................ 260/584 R
[51] Int. Cl............................................ C07c 91/04
[58] Field of Search................................ 260/584 R

[56] References Cited

UNITED STATES PATENTS

| | | | |
|---|---|---|---|
| 3,207,790 | 9/1965 | Glew et al. | 260/584 R |
| 2,823,236 | 2/1958 | Lowe et al. | 260/584 R |
| 3,382,208 | 5/1968 | Cyba | 260/584 R |
| 3,428,469 | 2/1969 | Cyba | 260/584 R |
| 3,321,506 | 5/1967 | Knowles | 260/584 X |
| 3,227,739 | 1/1966 | Versteeg | 260/584 X |

OTHER PUBLICATIONS

Fine Chemicals Patents Journal, No. 20, 8 German 5:3 (8/22/68) German Pat. No. 1,265,757 abstract Primary Examiner—Joseph P. Brust
Attorney—Griswold and Burdick, L. Wayne White and C. E. Rehberg

[57] ABSTRACT

Undesirable color formation in alkanolamine (e.g., triethanolamine) is inhibited by incorporating an inhibiting amount of an alkali or alkaline earth metal borate (e.g., sodium pentaborate) or an alkanolamine ester of boric acid into the alkanolamine.

16 Claims, No Drawings

COLOR-STABILIZED ALKANOLAMINES

BACKGROUND OF THE INVENTION

Alkanolamines are conventionally prepared by reacting an alkylene oxide with ammonia or an amine, and it is to be understood that the present invention is confined to those alkanolamines so prepared.

Alkanolamines, when freshly prepared, are water-white or very nearly water-white liquids. However, upon standing for some length of time, they generally darken to a yellow or yellow-green color. This darkening occurs regardless of whether or not the alkanolamine is exposed to daylight or sunlight and regardless of whether or not it is sealed from the atmosphere. The darkening is hastened generally if the alkanolamine is stored in a ferrous container (such as a steel drum). The darkening of the alkanolamine is objectionable in many instances, depending upon the end use. Triethanolamine, for example, is used extensively in the cosmetic market and thus must be largely color-free to be commercially acceptable.

Alkali metal borohydrides have been used to both decolorize and stabilize alkanolamines (U.S. Pat. No. 3,207,790) and to stabilize ethanolamines against discoloration (U.S. Pat. No. 3,159,276).

Boric acid, alkyl boric acid, hydrocarbon borates and other such organoboron compounds have been used to stabilize aromatic amines (U.S. Pat. No. 2,422,503).

SUMMARY OF THE INVENTION

It has now been discovered that the alkali and alkaline earth metal borates and alkanolamine esters of boric acid are particularly effective in inhibiting the formation of color in alkanolamines. Such borates will hereafter be referred to as borate inhibitors.

The alkali and alkaline earth metal borates are preferred.

The alkali and alkaline earth metal borates suitable for use herein may be any member selected from the known class of alkali and alkaline earth metal borates. The lithium, sodium, potassium, magnesium and calcium borates are the most common and may be used in either anhydrous or hydrated form. Examples of suitable such borates include lithium and potassium metaborate, lithium and potassium tetraborate, sodium tetraborate decahydrate (borax, $Na_2B_4O_7 \cdot 10 H_2O$), sodium tetraborate pentahydrate, sodium tetraborate (anhydrous borax), sodium pentaborate, magnesium orthoborate, magnesium metaborate octahydrate $(Mg(BO_2)_2 \cdot 8H_2O)$, calcium diborate $(CaB_2O_4)$, calcium triborate heptahydrate $(Ca_2B_6O_{11} \cdot 7H_2O)$, and the like. Borates as a class are described by F. A. Cotton and G. Wilkinson in "Advanced Inorganic Chemistry," Second Edition, Interscience Publishers (1966), pp. 264–266. Sodium and potassium borates (particularly sodium borates) are preferred.

The alkanolamine esters of boric acid are a known class of compounds. Each member of the class may be suitably used herein. Such esters are described, for example, by H. C. Brown et al., J.A.C.S. 73, 2808 (1951); H. Steinberg et al., Ind. Eng. Chem. 49, 174 (1957); "Organoboron Chemistry," Vol. 1 by Steinberg, Interscience Publishers, N.Y. (1964), Ch. 4 and 5, pp. 132–134 and 232–245 particularly. They are conveniently formed by reacting an alkanolamine with boric acid, generally in the presence of a suitable solvent. The preferred esters are those formed by reacting boric acid with the alkanolamine to be stabilized, e.g., the ester formed by reacting triethanolamine with boric acid would be a preferred inhibitor for triethanolamine, etc. Other such esters would include the esters formed by reacting boric acid with ethanolamine, diethanolamine, mono-, di- or tri-isopropanolamine, mono-, di- or tributanolamine, N-(2-hydroxyethyl)propylamine, N,N-di(2-hydroxyethyl) ethylamine, N,N-di(2-hydroxypropyl)butylamine.

The subject borate inhibitors are admixed with the alkanolamines in any small but effective amount to inhibit the formation of color in the alkanolamines. Amounts of borates of up to about 4 percent by weight, based on the alkanolamine, are generally sufficient, but more may be used if desired in any particular instance. Amounts of borate inhibitor of from about 0.004 percent to about 0.02 percent are typically preferred.

The subject borate inhibitors are generally soluble in the alkanolamines. The ease with which they dissolve in the alkanolamines will naturally vary with the particular borate and with the particular alkanolamine. Thus, for commercial operations it is advantageous to dissolve the borate in an aliquot of the alkanolamine and then add this solution to the bulk of alkanolamine to be stabilized. In those instances where the borate is substantially insoluble in the alkanolamine, the borate is blended into the alkanolamine as a finely divided solid.

As stated above, the alkanolamines which are stabilized in accordance with the subject invention are those conventionally prepared by reacting an alkylene oxide with ammonia or an amine. Those prepared by reacting ethylene oxide, propylene oxide and/or butylene oxide with ammonia or an amine are particularly important commercially. This invention pertains to all such alkanolamines and even more particularly to the ethanolamines and propanolamines which are prepared by reacting ethylene oxide or propylene oxide with ammonia (e.g., mono-, di- and/or triethanolamine; and mono-, di- and/or tripropanolamine).

DESCRIPTION OF THE PREFERRED EMBODIMENT(S)

Examples 1–12

The following examples, being accelerated aging tests, further illustrate the invention: In each of the examples, the borate was dissolved in 40.0 g. of alkanolamine and placed in a stoppered glass flask under a nitrogen blanket. The flask and contents were then heated for 24 hours at 120°C. The color of the alkanolamine was measured before and after heating. The results of a series of runs are tabulated in Table I. Experiments 1–15 were conducted using various samples of triethanolamine. In each instance, a "control" standard was run under the same conditions; said control being the same sample of trialkanolamine with no inhibitor. Color in APHA units.

TABLE I

| Ex. | Inhibitor (conc.) | Initial Color | Final Color Inhibited | Control |
|---|---|---|---|---|
| 1 | A (0.004%) | 30 | 43 | 50 |
| 2 | A (0.01%) | 30 | 30 | 50 |
| 3 | B (0.002%) | 30 | 47 | 50 |
| 4 | B (0.01%) | 20 | 20 | 35 |
| 5 | B (0.01%) | 70 | 70 | 120 |
| 6 | C (0.01%) | 20 | 20 | 40 |
| 7 | C (0.02%) | 5 | 5 | 20 |
| 8 | D (0.03%) | 10 | 10 | 60 |
| 9 | E (0.01%) | 35 | 35 | 60 |
| 10 | F (0.005%) | 30 | 35 | 50 |
| 11 | F (0.02%) | 30 | 30 | 50 |

| 12 | G (0.02%) | 5 | 5 | 20 |

Inhibitor A is sodium metaborate tetrahydrate (NaBO$_2$·4H$_2$O).

Inhibitor B is sodium tetraborate decahydrate (Na$_2$B$_4$O$_7$·10H$_2$O).

Inhibitor C is sodium pentaborate decahydrate (Na$_2$B$_{10}$O$_{16}$·10H$_2$O).

Inhibitor D is potassium tetraborate decahydrate (K$_2$B$_4$O$_7$·10H$_2$O).

Inhibitor E is potassium pentaborate decahydrate (K$_2$B$_{10}$O$_{16}$·10H$_2$O).

Inhibitor F is magnesium orthoborate (Mg$_3$B$_2$O$_6$).

Inhibitor G is sodium pentaborate decahydrate and was added as a 20 weight percent solution in diethanolamine.

Examples 13–16

Four 55-gallon aliquots of a non-stabilized triethanolamine (at least 98 percent pure with the remainder being predominantly diethanolamine) were placed in 55-gallon phosphated steel drums. Three of the drummed samples were then color-stabilized by adding 0.03 weight percent, total weight basis, of (a) sodium metaborate tetrahydrate, (b) sodium tetraborate decahydrate, and (c) sodium pentaborate decahydrate. The fourth drum of material (non-stabilized) was used as the control. All of the drums were then stored for four weeks under ambient conditions. The color of the materials so stored was measured; the color of the stabilized (inhibited) materials was unchanged while the color of the control darkened from the original color of 20 A.P.H.A. units up to 25-27 A.P.H.A. units. Aliquots from each of the so stored materials were subjected to the accelerated aging test set forth in Examples 1–12 above; the color of the stabilized materials remained unchanged while the control sample darkened to 45 A.P.H.A. units.

Examples 17–25

Using the accelerated aging test defined in Examples 1–12, the color stability of other alkanolamines in the presence of the subject borates was evaluated. The results are listed in Table II.

TABLE II

| Ex. | Alkanolamine | Inhibitor (conc.) | Initial Color | Final Color Inhibited | Control |
|---|---|---|---|---|---|
| 17 | MEA | A (0.02%) | 10 | 10 | 40 |
| 18 | MEA | B (0.05%) | 10 | 10 | 40 |
| 19 | DEA | A (0.04%) | 10 | 10 | 25 |
| 20 | DEA | B (0.01%) | 10 | 10 | 25 |
| 21 | MIPA | B (0.03%) | 5 | 5 | 30 |
| 22 | DIPA | A (0.01%) | 10 | 10 | 30 |
| 23 | DIPA | B (0.05%) | 10 | 10 | 30 |
| 24 | HEDA | A (0.03%) | 15 | 15 | 25 |
| 25 | DMEA | B (0.05%) | 30 | 30 | 60 |

MEA is monoethanolamine; DEA IS diethanolamine; MIPA is monoisopropanolamine; DIPA is diisopropanolamine; HEDA is N-(2-hydroxyethyl)ethylenediamine; and DMEA is N,N-dimethylethanolamine. Inhibitors A, B and C are as defined at the bottom of Table I.

Examples 26–28:

Using the accelerated aging test defined in Examples 1–12 except that a strip of mild steel (approximate surface area of 3 sq. in.) was submerged in the test liquid, the color stability of monoethanolamine and monoisopropanolamine in the presence of the subject borates was evaluated. The results are listed in Table III. Inhibitors A and B are as defined at the bottom of Table I.

TABLE III

| Ex. | Alkanolamine | Inhibitor (conc.) | Initial Color | Final Color Inhibited | Control |
|---|---|---|---|---|---|
| 26 | MEA | A (0.03%) | 10 | 40 | 160 |
| 27 | MEA | B (0.05%) | 10 | 40 | 160 |
| 28 | MIPA | A (0.04%) | 5 | 40 | 130 |

Examples 29–30

Using the accelerated aging test defined in Examples 1–12, the color stability of triethanolamine (TEA) was determined in the presence of the TEA ester of boric acid at two concentration levels. The results are summarized in Table IV.

TABLE IV

| Ex. | Inhibitor Conc. | Initial Color | Final Color Inhibited | Control |
|---|---|---|---|---|
| 29 | 0.05% | 20 | 20 | 60 |
| 30 | 0.15% | 20 | 20 | 60 |

The above TEA ester of boric acid was prepared by adding boric acid (110 g.; 1.77 moles) to TEA (263 g.; 1.77 moles) in 250 ml. of toluene and warming the mixture at reflux temperature until the reaction was complete. The water by-product was removed essentially as it was formed as a water/toluene azeotrope; approximately 96 g. of water were collected. The desired reaction product (276 g.) crystallized from the reaction mixture upon cooling and was removed by filtration. The white crystalline product melted at 234°–7°C. (literature reports 235°–7°C.).

Other alkanolamine esters of boric acid and other alkali and alkaline earth metal borates as described above may be similarly used to inhibit the formation of undesirable color in these and other alkanolamines.

I claim:

1. A combination of (a) at least one alkanolamine that develops undesirable color on aging and (b) at least one inorganic alkali or alkaline earth metal borate or an alkanolamine ester of boric acid in a small but sufficient amount to inhibit the formation of color in (a).

2. The combination defined by claim 1 wherein (a) is an ethanolamine, a propanolamine, a butanolamine or a mixture thereof.

3. The combination defined in claim 1 wherein (a) is mono-, di-, or triethanolamine or a mixture thereof.

4. The combination defined in claim 1 wherein (a) is mono-, di- or tripropanolamine or a mixture thereof.

5. The combination defined in claim 1 wherein (b) is an alkanolamine ester of boric acid.

6. The combination defined in claim 5 wherein said ester is a boric acid ester of an alkanolamine in (a).

7. The combination defined in claim 6 wherein (a) is mono-, di- or triethanolamine or a mixture thereof.

8. The combination defined in claim 1 wherein (b) is present in amounts of up to about 4 percent by weight, based on the weight of (a).

9. A process for inhibiting the formation of undesirable color in an alkanolamine or a mixture of alkanolamines which comprises incorporating into said alkanolamine or alkanolamine mixture a small but sufficient amount of at least one inorganic alkali or alkaline earth metal borate or an alkanolamine ester of boric acid to inhibit color formation.

10. The combination defined by claim 1 wherein (b) is an inorganic alkali or alkaline earth metal borate.

11. The combination defined by claim 10 wherein (b) is an inorganic sodium or potassium borate.

12. The combination defined by claim 11 wherein (b) is an inorganic sodium borate.

13. The combination defined by claim 10 wherein (b) is lithium, sodium or potassium metaborate.

14. The combination defined by claim 10 wherein (b) is sodium or potassium tetraborate or pentaborate.

15. The combination defined by claim 1 wherein
(a) is mono-, di- or triethanolamine or a mixture thereof, or mono-, di- or tripropanolamine or a mixture thereof, and
(b) is lithium, sodium or potassium metaborate, sodium or potassium tetraborate, or sodium or potassium pentaborate.

16. The combination defined by claim 15 wherein
(a) is mono-, di- or triethanolamine or a mixture thereof, and
(b) is lithium, sodium or potassium metaborate.

* * * * *